US009699842B2

(12) United States Patent
Allen, Jr. et al.

(10) Patent No.: US 9,699,842 B2
(45) Date of Patent: Jul. 4, 2017

(54) COMPLEMENTARY CONVERTER FOR SWITCH MODE POWER SUPPLY

(71) Applicant: Licon Technology Corporation, Santa Clara, CA (US)

(72) Inventors: James A. Allen, Jr., Santa Clara, CA (US); Andrew Davis, Santa Clara, CA (US); Matthew Whitlock, Santa Clara, CA (US); Brent Dae Hermsmeier, Santa Clara, CA (US)

(*) Notice: Subject to any disclaimer, the term of this patent is extended or adjusted under 35 U.S.C. 154(b) by 0 days.

(21) Appl. No.: 15/098,613

(22) Filed: Apr. 14, 2016

(65) Prior Publication Data

US 2017/0055321 A1    Feb. 23, 2017

Related U.S. Application Data

(60) Provisional application No. 62/206,221, filed on Aug. 17, 2015.

(51) Int. Cl.
| | | |
|---|---|---|
| *H05B 41/39* | (2006.01) | |
| *H05B 33/08* | (2006.01) | |
| *H02M 3/335* | (2006.01) | |

(52) U.S. Cl.
CPC .... *H05B 33/0815* (2013.01); *H02M 3/33507* (2013.01)

(58) Field of Classification Search
CPC ......... H02M 3/3376; H02M 2001/007; H02M 1/36; H02M 1/4258; H02M 2001/0006; H02M 2001/0058; H02M 3/158; H02M 3/33592; H02M 3/337; H02M 3/3374; H02M 3/3378; H02M 7/53803; H02M 2001/0048; H02M 7/483; H02M 1/42; H02M 2001/4291; H02M 3/157; H02M 3/1588; F21K 9/23; F21K 9/27

See application file for complete search history.

(56) References Cited

U.S. PATENT DOCUMENTS

| | | | |
|---|---|---|---|
| 7,391,630 B2 | 6/2008 | Acatrinei | |
| 8,203,320 B2 * | 6/2012 | Leman | H02M 3/155 323/282 |
| 2012/0075859 A1 | 3/2012 | Granado et al. | |

OTHER PUBLICATIONS

U.S. Appl. No. 15/098,616 by Reed et al., filed Apr. 14, 2016.

* cited by examiner

*Primary Examiner* — Monica C King
(74) *Attorney, Agent, or Firm* — Perkins Coie LLP

(57) ABSTRACT

A complementary converter is a switch mode converter circuit that uses one pulse-width modulation (PWM) controller and one power MOSFET to run a two-stage power-factor-corrected (PFC) power supply. The two-stage power-factor-corrected power supply can include a power-factor-corrected boost converter, and a DC-to-DC converter (either step-up or step-down). The DC-to-DC converter can be, e.g., a Flyback, Forward, Cuk, or Buck Converter. The complementary converter circuit includes a voltage input section that takes a universal $V_{AC}$ input and rectifies the input. Then the PFC boost converter boosts the rectified half-cycle DC to a DC line at a higher voltage. The complementary converter circuit further includes an integrated circuit with the power-factor-correction and PWM switching capabilities to control the converters. The DC-to-DC converter brings the voltage down to an appropriate level for the final load (e.g., LEDs).

21 Claims, 14 Drawing Sheets

COMPLEMENTARY CONVERTER FOR SWITCH MODE POWER SUPPLY

CROSS-REFERENCE TO RELATED APPLICATION

This application claims the benefit of U.S. Provisional Patent Application No. 62/206,221, entitled "Complementary Converter For Switch Mode Power Supply", which was filed on Aug. 17, 2015, which is incorporated by reference herein in its entirety.

BACKGROUND

An LED (light-emitting diode) light engine is a device including at least one LED module and an LED driver (also referred to as electronic control gear (ECG)). The LED light engines are widely used in various applications such as indicators, signs, luminaires, LCD (liquid crystal display) backlights, automobile headlights, medical devices, and optical communications.

Industry standards, such as Zhaga, specify the interfaces between LED light engines and application devices (e.g., LED luminaires), without unnecessarily restricting the design of the LED light engines. The interfaces can include mechanical, thermal and electrical interfaces. In some situations, particularly in the luminaire retrofit field, the LED light engine's shape and dimensions specified by these industry standards pose significant challenges to the design of the LED light engines, particularly in terms of component space and cost.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1:
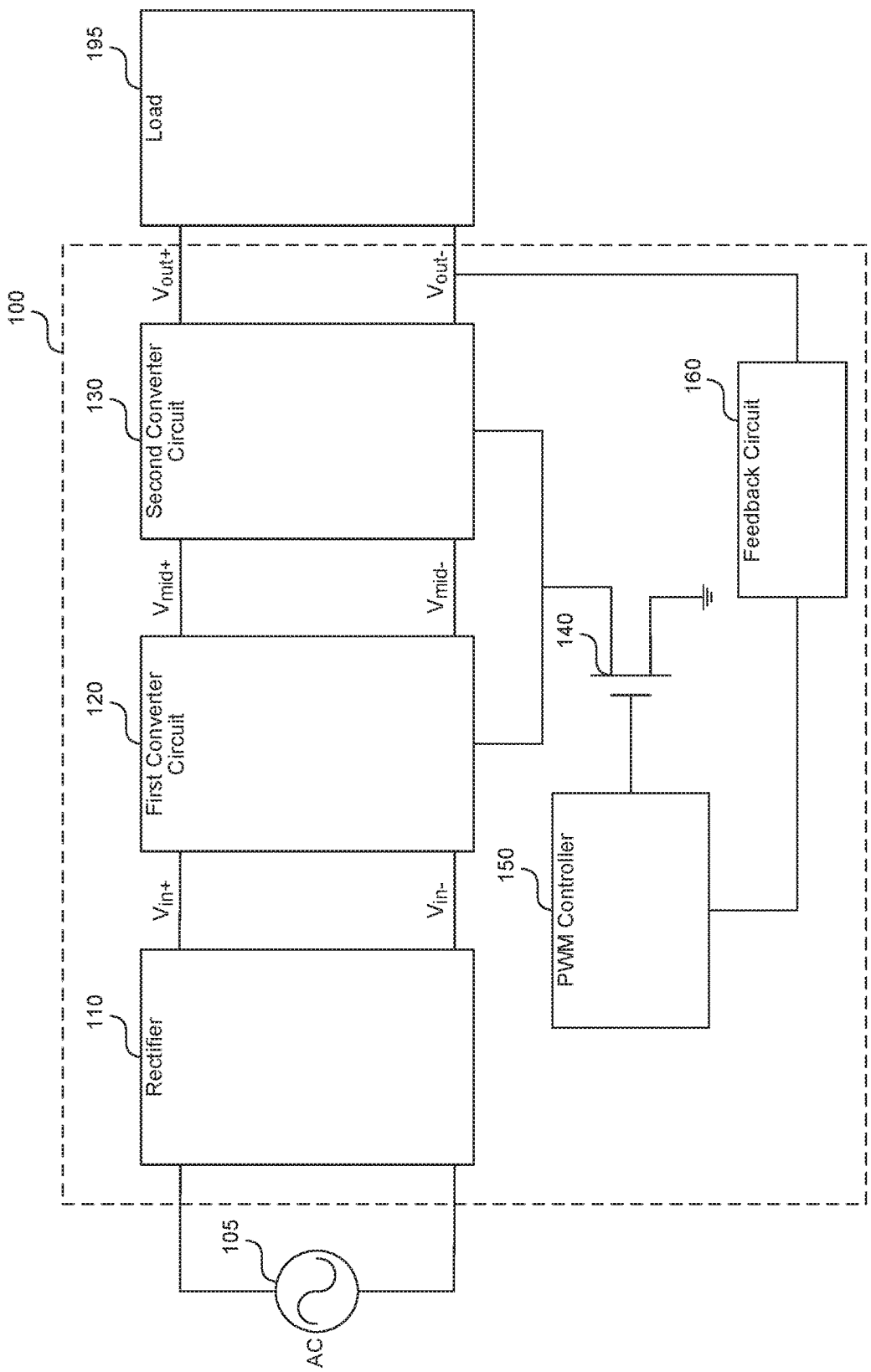
FIG. 1 is a block diagram illustrating an example of a complementary converter circuit, according to a first embodiment of the technology.

References in this description to an embodiment", one embodiment", or the like, mean that the particular feature, function, structure or characteristic being described is included in at least one embodiment of the present invention. Occurrences of such phrases in this specification do not necessarily all refer to the same embodiment. On the other hand, the embodiments referred to also are not necessarily mutually exclusive.

The technology disclosed herein, includes a complementary converter circuit, provides a low-cost power supply solution that can be achieved using a small amount of parts and can be fit into a limited space. For example, such a power supply can fit into form factor having a 48 mm diameter, which specified by Zhaga, a light engine interface specification.

The technology provides a light engine with a low flickering index, which means the current supplied to the LEDs is relative flat so that ripples at 60 or 120 Hz are not noticeable by human eyes or shown on CCTV (closed-circuit television) cameras. The technology includes a boost converter to step up the voltage and to remove the ripples and another power converter to step down (or step up) the voltage to a level appropriate for driving the load, i.e. the LEDs. There is only one MOSFET (metal-oxide-semiconductor field-effect transistor) and one pulse-width modulation (PWM) controller needed for controlling the boost converter and the second converter. Because these two power converters are complementary to each other (the combination is referred to as a complementary converter), there is no need for two separate switches to control the duty cycles of the two power converters separately.

A complementary converter is a switch mode converter circuit that uses one pulse-width modulation (PWM) controller and one power MOSFET to run a two-stage power-factor-corrected (PFC) power supply. For example, the two-stage power-factor-corrected power supply can include a power-factor-corrected boost converter, and a DC-to-DC converter (either step-up or step-down). The single PWM controller and the single power MOSFET simultaneously control the duty cycles of both converters.

The DC-to-DC converter can be, e.g., a Flyback, Forward, Cuk, or Buck Converter. The complementary converter circuit includes a voltage input section that takes a universal $V_{AC}$ input and rectifies the input. Then the PFC boost converter boosts the rectified half-cycle DC to a DC ("direct current") line at a higher voltage. The complementary converter circuit further includes an integrated circuit with the power-factor-correction and PWM switching capabilities to control the converters. The DC-to-DC converter brings the voltage down to an appropriate level for the final load (e.g., LEDs).

An output synchronous rectification circuit turns the switching frequency into a flat DC output. A feedback loop provides a servo feedback from output of the step-down converter to the PWM controller. The complementary converter can be used in various power converter applications such as LED Drivers, PC Adaptor, and Hot Swap Blade Supply. The complementary converter principal can be further extended to cover a variety of circuit topologies such as multi-stage PFC, other signal shaping beyond PFC, and parallel stages/loads.

FIG. 1 is a block diagram illustrating an example of a complementary converter circuit, according to an embodiment of the technology. The complementary converter circuit 100 includes a rectifier 110, a first converter circuit 120, a second converter circuit 130, a shared switch 140 and a shared pulse-width modulation (PWM) controller 150. The input end of the complementary converter circuit 100 (i.e., the input end of the rectifier 110) can be connected with an alternating-current (AC) electric power supply 105. The AC electric power supply 105 can be, e.g., the mains electricity supply (also referred to as household power, wall power, or grid power) at, e.g., 100V, 110V, 120V, 220V or 230V.

The rectifier 110 converts the alternating current (AC) from the AC electric power supply 105 to direct current (DC). The rectifier 110 can be, e.g., a bridge rectifier (BR) that includes a bridge of four rectifying diodes. The bridge rectifier converts the AC input voltage into a pulse (semi cycles) DC voltage.

The first converter circuit 120 receives the DC voltage from the rectifier 110 via inputs $V_{in+}$ and $V_{in-}$. The first converter circuit 120 outputs its converted DC voltage at outputs $V_{mid+}$ and $V_{mid-}$, which are in turn the inputs of the second converter circuit 130. The second converter circuit 130 receives the DC voltages from the first converter circuit 120, and outputs its converted DC voltage at outputs $V_{out+}$ and $V_{out-}$, which applies to the load 195 (e.g., one or more LEDs).

The first converter circuit 120 and the second converter circuit 130 can be, e.g., switch-mode DC-to-DC power converter circuits. In other words, each of the first converter circuit 120 and the second converter circuit 130 uses a switch to store the input energy temporarily and then to release the energy at a voltage different from the input voltage. As illustrated in FIG. 1, the first converter circuit 120 and the second converter circuit 130 shares a common switch 140 so that the duty cycles and switching frequencies of the first converter circuit 120 and the second converter circuit 130 are synchronized via the common switch 140. The common switch 140 can be, e.g., a power MOSFET (metal-oxide-semiconductor field-effect transistor) switch.

The first converter circuit 120 and the shared switch 140 can form various types of DC-to-DC power converters. For example, the first converter circuit 120 and the shared switch 140 can form, e.g., a Boost converter, a Buck converter, a Flyback converter, a forward converter, a SEPIC (single-ended primary-inductor converter) converter, a Cuk converter, an LLC converter, or a step-up tapped-inductor converter. Similarly, the second converter circuit 130 and the shared switch 140 can also form, e.g., a Boost converter, a Buck converter, a Flyback converter, a forward converter, a SEPIC (single-ended primary-inductor converter) converter, a Cuk converter, an LLC converter, or a step-up tapped-inductor converter.

The PWM controller 150 controls the operation of the switch 140, and in turn controls the duty cycles and switching frequencies of the first converter circuit 120 and the second converter circuit 130 via the switch 140. The PWM controller 150 receives a feedback signal from the output of the second converter circuit 130, via a feedback circuit 160. In some embodiments, the feedback circuit 160 can be simply a wire directly transferring the current signal servo feedback to the PWM controller 150 so that the PWM controller 150 can protect the LEDs load by avoiding generating current that can potentially damage the LEDs. Alternatively, the feedback circuit 160 can include loop compensation components (e.g., capacitors) to cause loop response delay for optimized power factor correction.

The PWM controller 150 is designed to control the on/off pulses of the switch 140 in such a way that the momentary current value in the first converter circuit 120 becomes proportional to the momentary voltage value at inputs $V_{in+}$ and $V_{in-}$. The PWM controller 150 provides a constant train of driving pulse with constant duty cycle for one semi-cycle of the rectified DC voltage. This design forces the current shape of the first converter circuit 120 to follow the input voltage shape of the first converter circuit 120, i.e., the momentary current is contingent and linearly proportional to the momentary voltage. In other words, the design pushes the power factor (PF) parameter value of the first converter circuit 120 close to 1.

Similarly, the PWM controller 150 is designed to control the on/off pulses of the same switch 140 in such a way that the momentary current value in the second converter circuit 130 becomes proportional to the momentary voltage value at inputs $V_{mid+}$ and $V_{mid-}$. This design again forces the input current shape of the second converter circuit 130 to follow the input voltage shape of the second converter circuit 130. In other words, the design pushes the power factor (PF) parameter value of the second converter circuit 130 close to 1. Therefore, the PWM controller 150 and the switch 140 achieve power factor corrections (PFCs) for both first and second converter circuits 120 and 130.

In order to enable the single set of the PWM controller 150 and the switch 140 to achieve power factor corrections for both converter circuits 120 and 130 simultaneously, the first and second converter circuits 120 and 130 are designed to the complementary to each other. In the complementary converter circuits 120 and 130, the time differences between the current and voltage waveforms, due to the energy storage in capacitors and/or inductors, are similar or even the same. In other words, the phase angles between the currents and voltages of the converter circuits 120 and 130 (even prior to the power factor corrections) are substantially equal or close. The equal or close phase angles can be achieved by adjusting the converter circuits 120 and 130, such as adding or removing components (e.g., inductors or capacitors).

Such a complementary converter circuit 100 can include multiple converter circuits that are controlled by a single set of a PWM controller and a switch. The design of the complementary converter circuit 100 significantly reduces the cost and size of the circuit, because only one PWM controller and one switch are needed to control the duty cycles the converter circuits. Regardless of the number of converter circuits within complementary converter circuit 100, the single set of the PWM controller and the switch achieves power factor corrections for the multiple converter circuits simultaneously.

In some embodiments, the first converter circuit 120 and the shared switch 140 forms a boost converter to step up the input DC voltage (from the rectifier 110). By adjusting the duty cycle of the Boost converter (and in turn the input/output voltage ratio), the Boost converter can flatten the driving current, and therefore can reduce the driving current ripples due to the rectified source current from AC power supply. This effectively reduces the flickering index of the driven LEDs.

The second converter circuit 130 and the shared switch 140 forms another DC-to-DC converter to further step down or step up the voltage so that the voltage at $V_{out+}$ and $V_{out-}$ is an appropriate voltage for the load 195.

When the load 195 is LEDs, there is a desirable range of voltage drop across the LEDs, depending on the band gaps of the LEDs and the number of the LEDs in series. The converter circuits 120 and 130 (and their duty cycles) are designed to apply an appropriate voltage within the desirable range of voltage drop.

Figure 2:
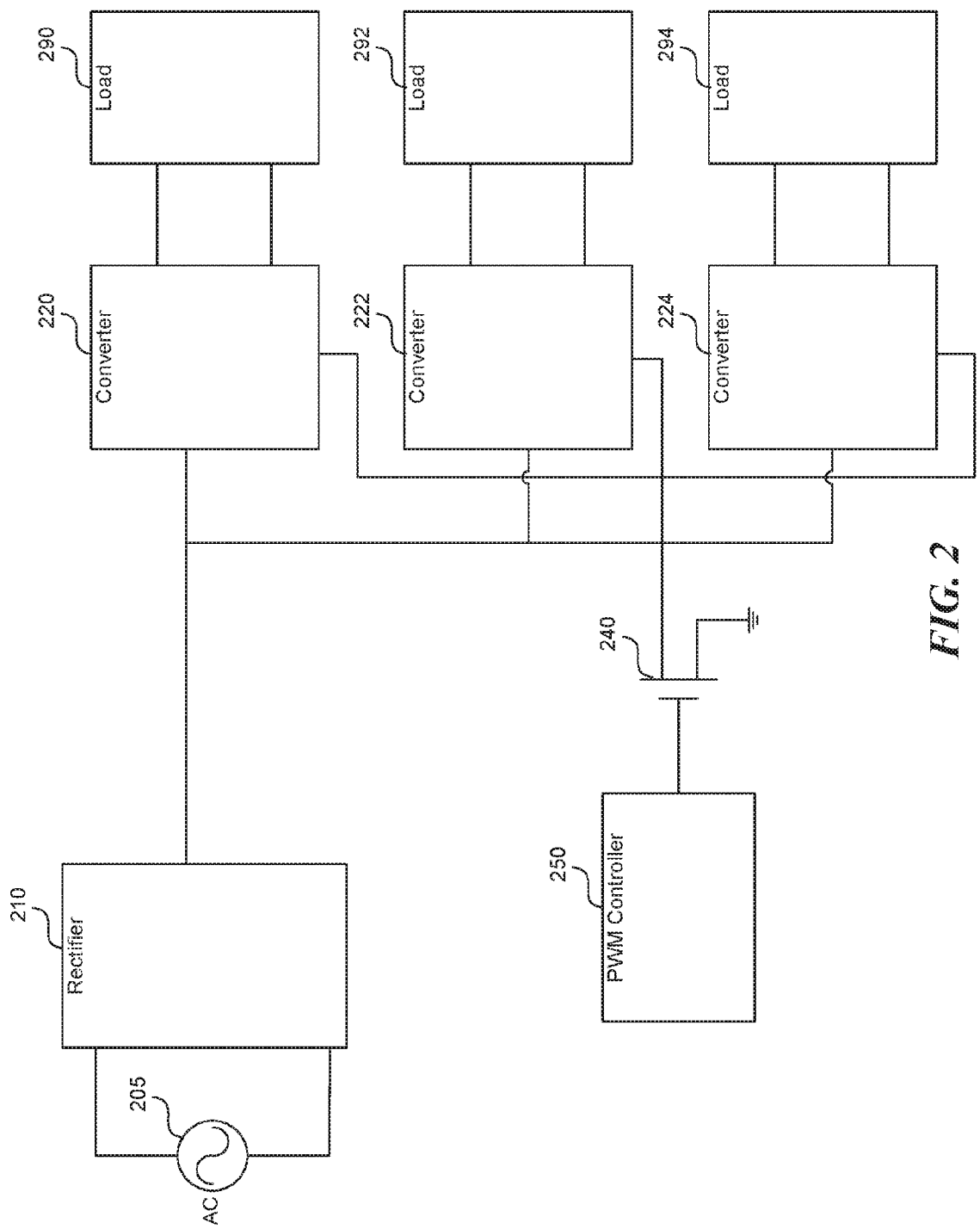
FIG. 2 is a block diagram illustrating an example of a complementary converter circuit, according to a second embodiment of the technology.

The technology disclosed herein not only can apply to converter circuits that are connected in series, but also can apply to converter circuits that are connected in parallel. FIG. 2 is a block diagram illustrating an example of a complementary converter circuit, according to another embodiment of the technology. The rectifier 210 convert converts the AC current from AC electric power supply 205 to DC current with half cycles. Then the rectifier 210 supplies the DC to power converter circuits 220, 222 and 224 which are arranged in parallel.

Each of the power converter circuits 220, 222 and 224 is designed to step up or step down the DC voltage in order to drive the loads 290, 292 and 294 respectively. The loads 290, 292 and 294 can be, e.g., groups of LEDs that emit light in different wavelengths (i.e. different colors). A PWM controller 250 controls a shared power MOSFET switch 240. Power converter circuits 220, 222 and 224 all use the shared power MOSFET switch 240 as the switch to control their duty cycles.

The power converter circuits 220, 222 and 224 are complementary circuits so that the single set of the PWM controller 250 and the switch 240 can achieve power factor corrections for the multiple converter circuits 220, 222 and 224 simultaneously.

Figure 3:
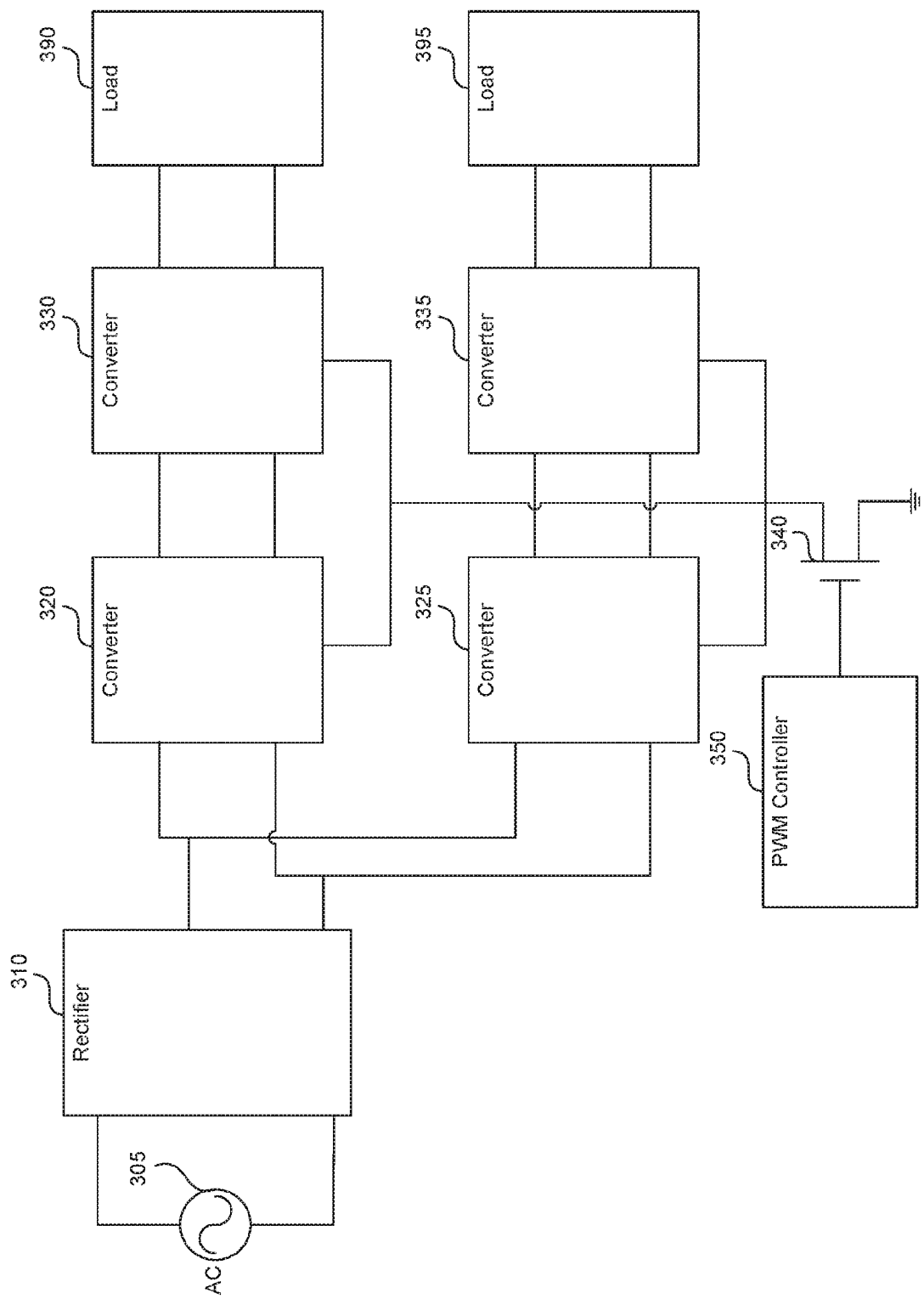
FIG. 3 is a block diagram illustrating an example of a complementary converter circuit, according to a third embodiment of the technology.

Similarly, the technology disclosed herein can apply to converters that are arranged in a more complex topology. FIG. 3 is a block diagram illustrating an example of a complementary converter circuit, according to an embodiment of the technology. The rectifier 310 converts the AC current from AC electric power supply 305 to DC current with half cycles. Then the rectifier 310 supplies the DC to power converter circuits 320 and 325.

The converter circuits 320 and 330 form a two-stage converter circuit for driving load 390; while the converter circuits 325 and 335 form another two-stage converter circuit for driving load 395. These two two-stage converter circuits are then arranged in parallel.

The power converter circuits 320, 325, 330 and 335 are designed to step up or step down the DC voltage in order to provide appropriate voltages for the loads 390 and 395. A PWM controller 350 controls a shared power MOSFET switch 340. Power converter circuits 320, 325, 330 and 335 all use the shared power MOSFET switch 340 as the switch to control their duty cycles.

The power converter circuits 320, 325, 330 and 335 are complementary circuits so that the single set of the PWM controller 350 and the switch 340 can achieve power factor corrections for the multiple converter circuits 320, 325, 330 and 335 simultaneously.

Figure 4A:
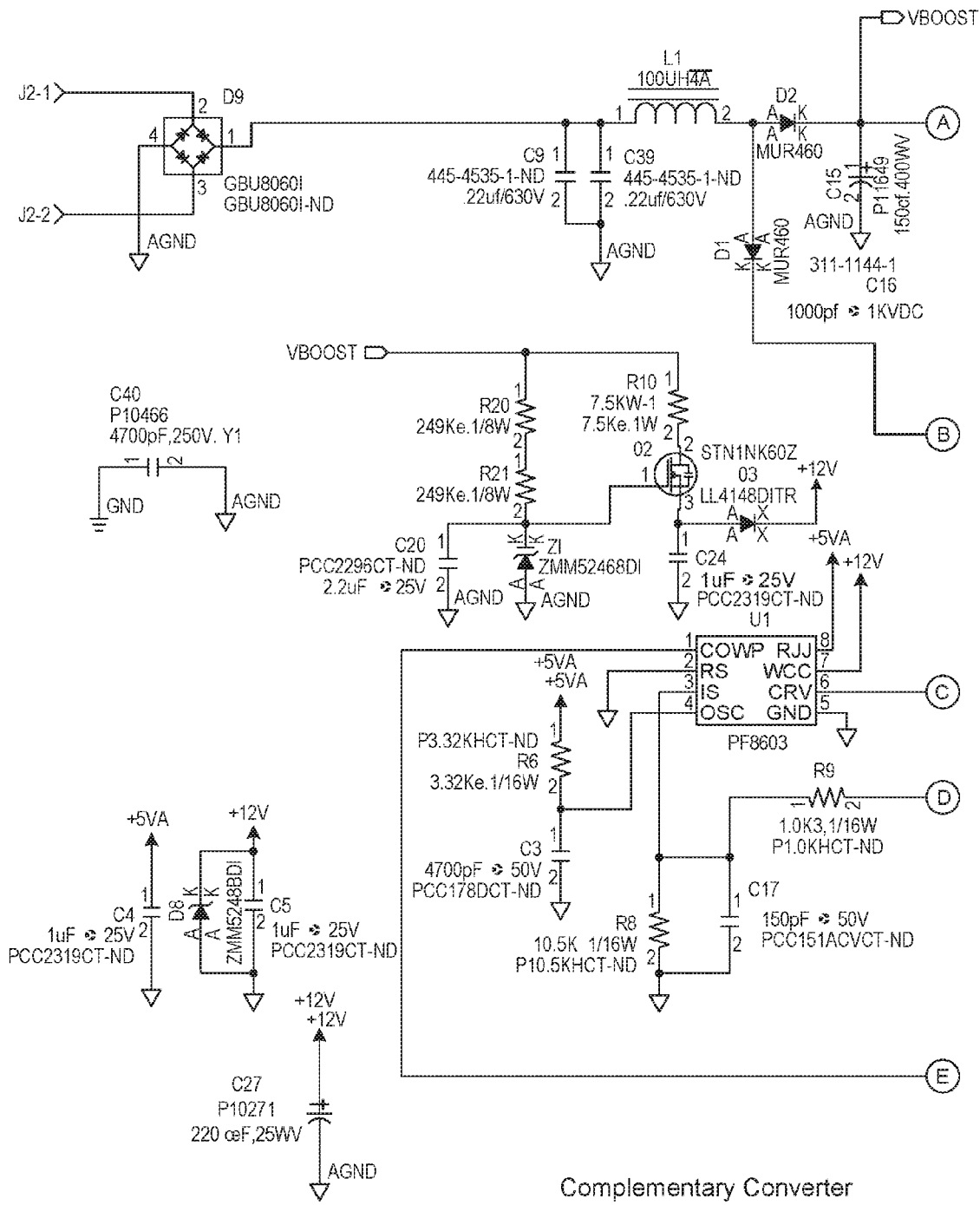
FIGS. 4A-4C are portions of a schematic diagram illustrating an example of a complementary converter circuit, according to a fourth embodiment of the technology.
Figure 4B:
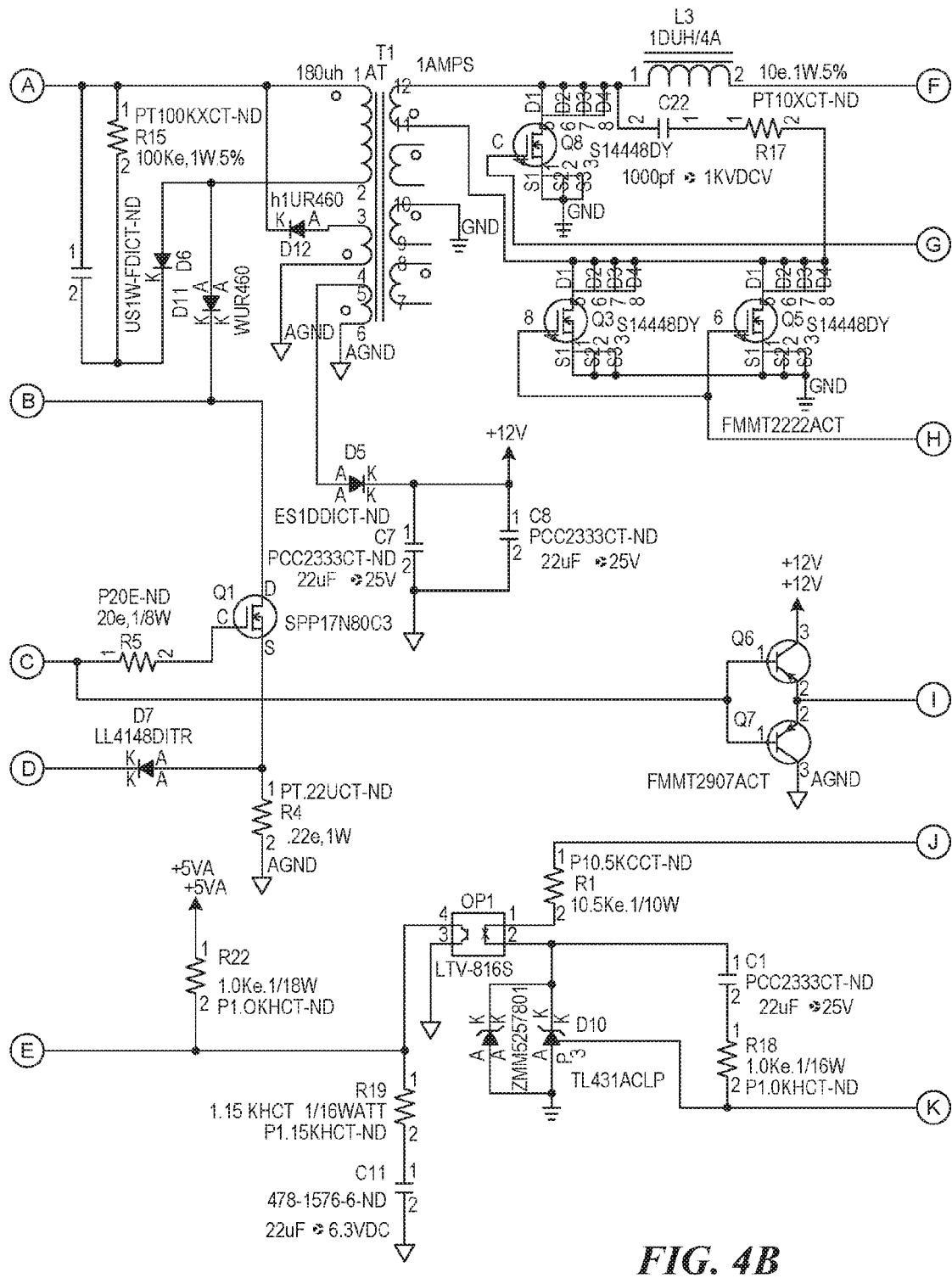
Figure 4C:
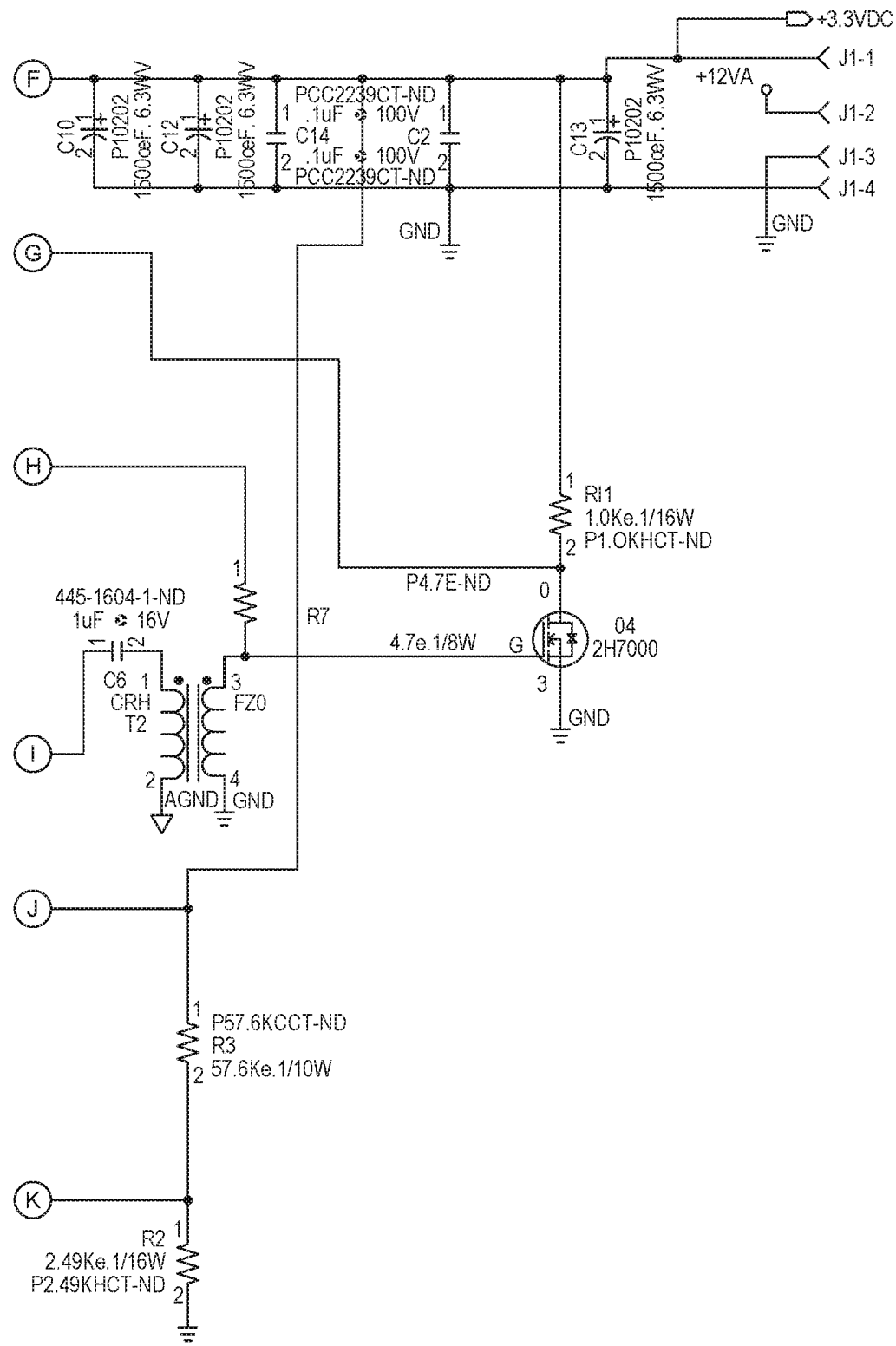

FIGS. 4A-4C illustrates a schematic diagram illustrating an example of a complementary converter circuit, according to an embodiment of the technology. The Complementary Converter is a switch mode power converter circuitry that uses one PWM Controller and one power MOSFET to run a two-stage power factor corrected (PFC) power supply. The complementary converter includes a PFC boost converter section, and a DC-to-DC step-up or step-down converter. The converters can be of various types, such as Flyback, Forward, Cuk, SEPIC, LLC, Buck or Step-up tapped-inductor Converter. Applications for the complementary converter can be, e.g., LED Drivers, PC Adaptor, and Hot Swap Blade Supply. The following paragraphs that relate to FIGS. 5-11 discuss different sections of the complementary converter circuit in details.

Figure 5:
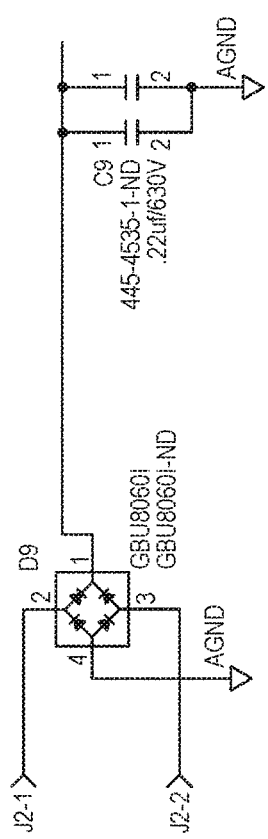
FIG. 5 shows a portion of the complementary converter circuit illustrated in FIGS. 4A-4C.

FIG. 5 shows a voltage input section of the complementary converter circuit illustrated in FIGS. 4A-4C. The voltage input section as illustrated in FIG. 5 includes a rectifier circuit that rectifies the AC input and is designed to be able to take universal input 85 vac to 277 vac at 50/60 Hz, for example. The rectifier circuit can be a bridge rectifier that includes four rectifying diodes forming a bridge configuration to convert the AC input into a semi-cycle pulse DC current.

Figure 6:
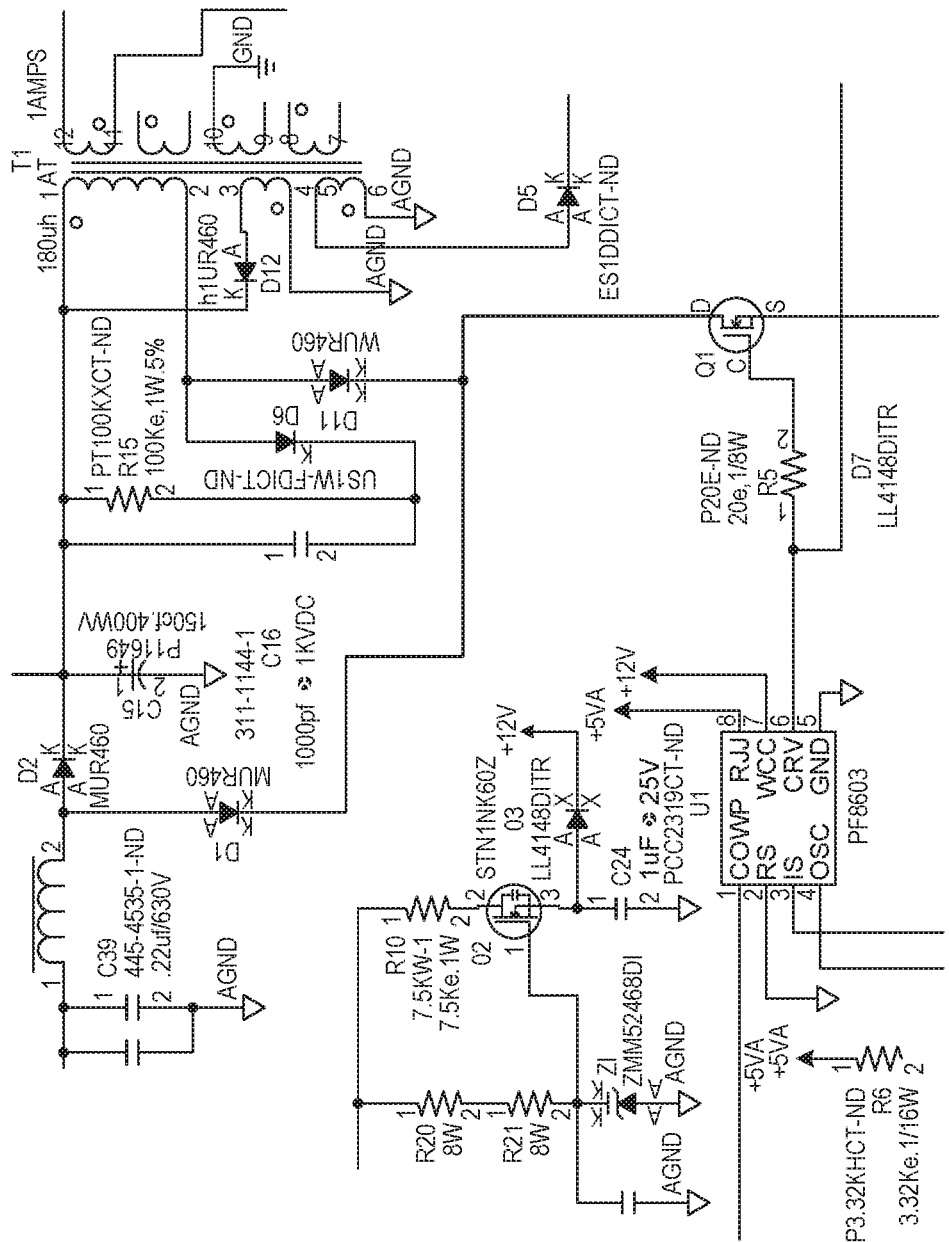
FIG. 6 shows a voltage input section of the complementary converter circuit illustrated in FIGS. 4A-4C.

FIG. 6 shows a portion of the complementary converter circuit illustrated in FIGS. 4A-4C, including two switch-mode power converters, the shared switch and the shared PWM controller. The complementary converter includes components such as D1, D11, Q1 and U1 that provide a unique topology that can be applied to various applications with saved cost. The diode D1 from the first boost converter and the diode D11 from the second step-down converter form an ORing architecture, as both diodes D1 and D11 lead their currents to the switching node of the power supply (the switching node comprising the switching MOSFET Q1 and the PWM controller U1). Because of the ORing architecture of D1 and D11, the circuit needs only one PFC/PWM controller U1 and only one Switching MOSFET Q1 to control both the boost PFC converter and the DC-to-DC step-down converter. The DC-to-DC step-down converter can be anyone of the known and convenient topologies such as flyback, or forward. The overall gain of the circuit is established by T1's turns Ratio.

Figure 7:
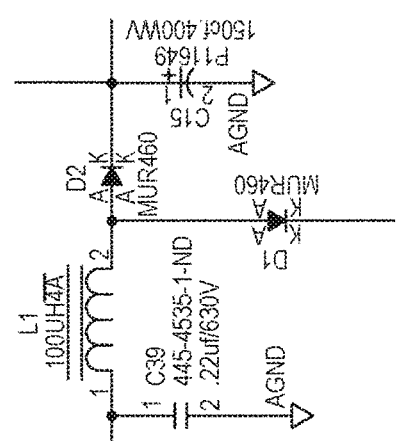
FIG. 7 shows a boost section of the complementary converter circuit illustrated in FIGS. 4A-4C.

FIG. 7 shows a PFC boost converter section of the complementary converter circuit illustrated in FIGS. 4A-4C. This PFC boost converter section serves at least two functions: A) to boost the input line from AC (after rectification) to approximately $400V_{Dc}$; B) Because the input boost inductor can be designed in a discontinuous mode, it can utilize constant pulse proportional current (CPPC) to achieve good PFC result. The CPPC mechanism is discussed in details by U.S. Pat. No. 7,391,630 and U.S. Patent Application Publication 2012/0075859, which are incorporated by references herein. Diode D2 is the boost diode (also the flyback diode) which charges capacitor C15 to about $400V_{DC}$. Diode D1 is the ORing diode connected to the shared switching MOSFET Q1.

When the shared switching MOSFET Q1 is closed, the current in the conductor L1 increases to temporarily store electrical energy. When the shared switching MOSFET Q1 is open, the current is directed from the conductor L1 through the flyback diode D2 to the capacitor C15 and downward circuitry. This results in transferring the accumulated energy into the capacitor C15. The PWM switching controller U1 is responsible for regulating the open/close status of the switching MOSFET Q1 with certain duty cycle.

Figure 8:
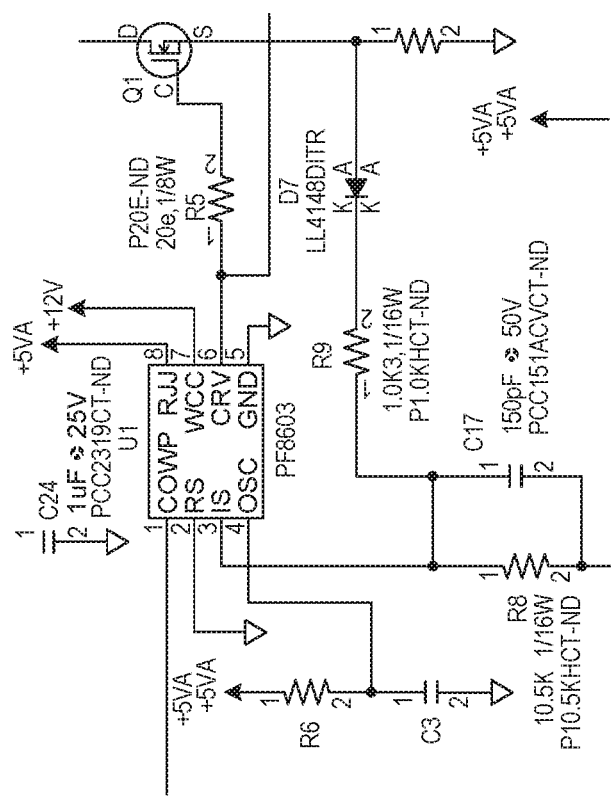
FIG. 8 shows a switching control section of the complementary converter circuit illustrated in FIGS. 4A-4C.

FIG. 8 shows a PFC/PWM switching section of the complementary converter circuit illustrated in FIGS. 4A-4C. The PFC/PVVM switching section can include a switching controller U1. In some embodiments, the switching controller U1 can be implemented as an integrated circuit (IC) such as PF8803. This integrated circuit controller simultaneously performs two functions: providing power factor correction (PFC) and regulating the MOSFET switching for power-width modulation. Resistor R6 and capacitor C3 sets the clock frequency of the switching controller U1. Resistor R8 sets the duty cycle. Pin1 of controller U1 is the voltage mode comp feed back to the IC. Switching MOSFET Q1 is the main switching element shared by the boost converter illustrated in FIG. 7 and the step-down converter illustrated in FIG. 9. Although FIG. 8 illustrates a MOSFET as the switch Q1, a person having ordinary skill in the art readily appreciates that Q1 can use other types of switch, such as JFET (junction field-effect transistor) or IGBT (insulated-gate bipolar transistor).

Figure 9:
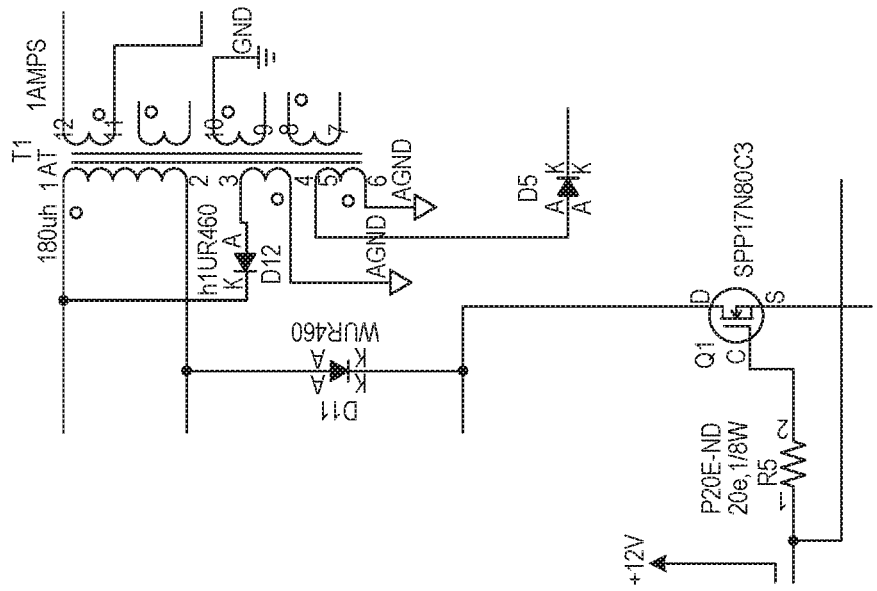
FIG. 9 shows a step-down converter section of the complementary converter circuit illustrated in FIGS. 4A-4C.

FIG. 9 shows a step-down converter section of the complementary converter circuit illustrated in FIGS. 4A-4C. In the DC-to-DC step-down converter section, T1 is a DC-to-DC step-down transformer. The turns ratio of the transformer T1 determines the overall gain of the complementary converter circuit. D11 is the ORing diode connected to the shared switching MOSFET Q1. This circuit ensures an impedance matching from the input switch Q1 and diode D11 to the output Load. In various embodiments, the step-down converter can be in, e.g., Flyback, Forward, SEPIC, Cuk, Buck, Buckboost LLC Forward, LLC Flyback output, LLC SEPIC, LLC Cuk and Tap Inductor topologies. Although FIG. 9 shows a step-down converter, the second converter can be a step-up converter as well, depending on the voltage needed for properly driving the load (LEDs).

The step-down converter shown in FIG. 9 and the boost converter shown in FIG. 7 shares the switching MOSFET Q1 and the switching controller U1. Thus, the boost converter and the step-down converter operate at the same switching frequency and the same duty cycle.

Figure 10:
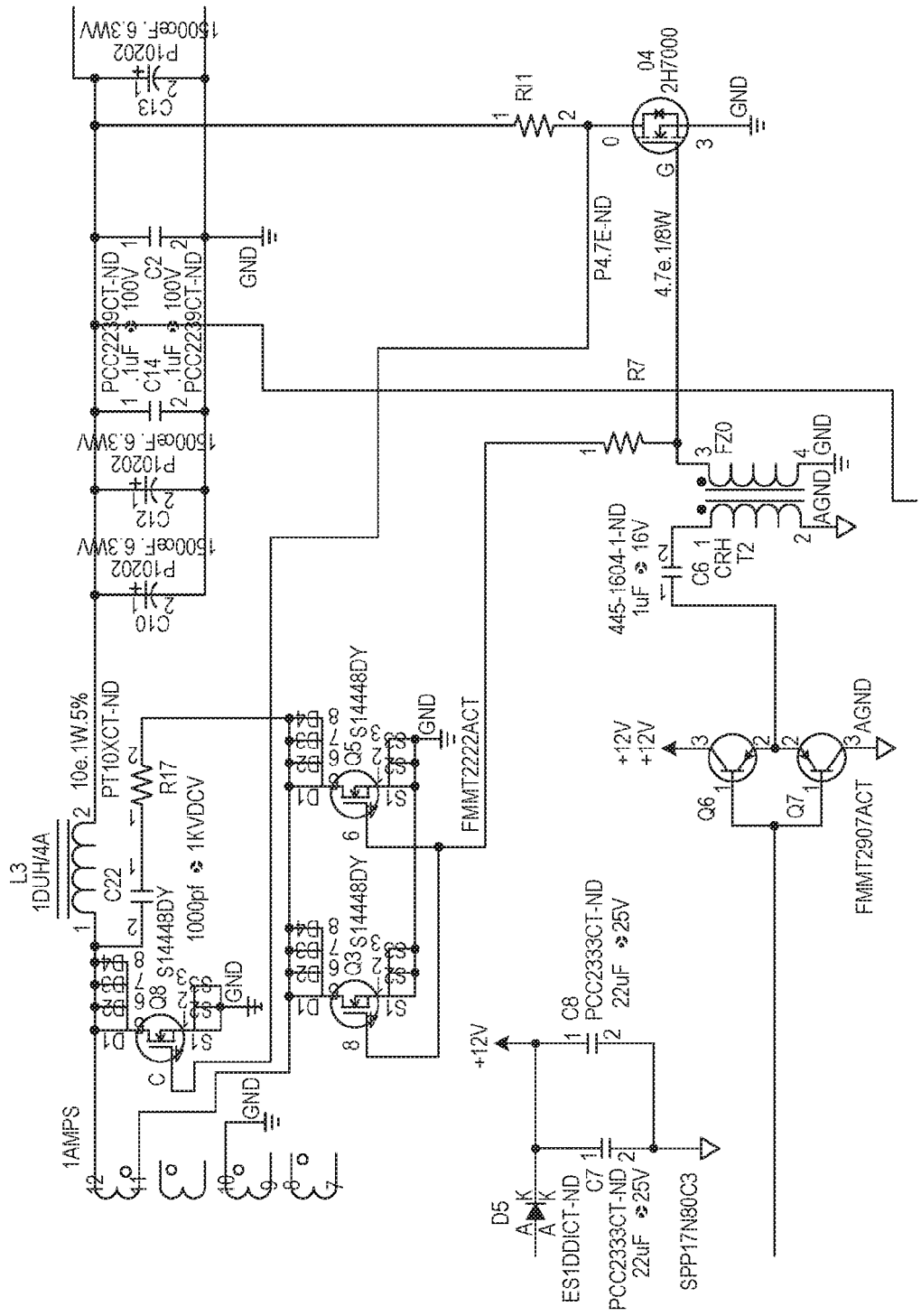
FIG. 10 shows an output synchronous rectification section of the complementary converter circuit illustrated in FIGS. 4A-4C.

FIG. 10 shows an output synchronous rectification section of the complementary converter circuit illustrated in FIGS. 4A-4C. The output synchronous rectification section is responsible for turning the fluctuating waveform with a switching frequency into a flat DC output. The synchronous rectification section includes actively controlled switches Q3 and Q5 for rectifying the voltage outputted by the transformer T1 (part of the DC-to-DC step down converter). Switch Q8 is the synchronous catch rectifier for inductor L3. Switches Q3 and Q5 are controlled to open and close their gates at proper times to allow current to flow in the correct direction towards inductor L3. The pulsating voltage goes through the smoothing filter including inductor L3 and capacitors C10, C12 and C15. The flattened output DC after the smoothing filter is applied to the load (LEDs).

The switches Q6 and Q7 and the transformer T2 form an isolated gate drive from the PWM switching controller U1 to the synchronous rectifier circuit including Q3 and Q5. In other words, the controller U1 not only controls the operation of the boost and step-down converters illustrated in FIGS. 7 and 9 via a single shared switch Q1, but also controls the synchronous rectifier circuit (Q3 and Q5) through the isolated gate drive circuit.

Note that the output synchronous rectifier in FIG. 10 uses various switches such as Q3, Q5, Q6 and Q7 for functionalities including actively controlled rectification and isolated gate drive. However, these switches of the rectifier are separated from the shared switching MOSFET Q1. There is only one shared MOSFET Q1 serving as the shared switch for both the boost converter in FIG. 7 and the step-down converter in FIG. 9.

Figure 11:
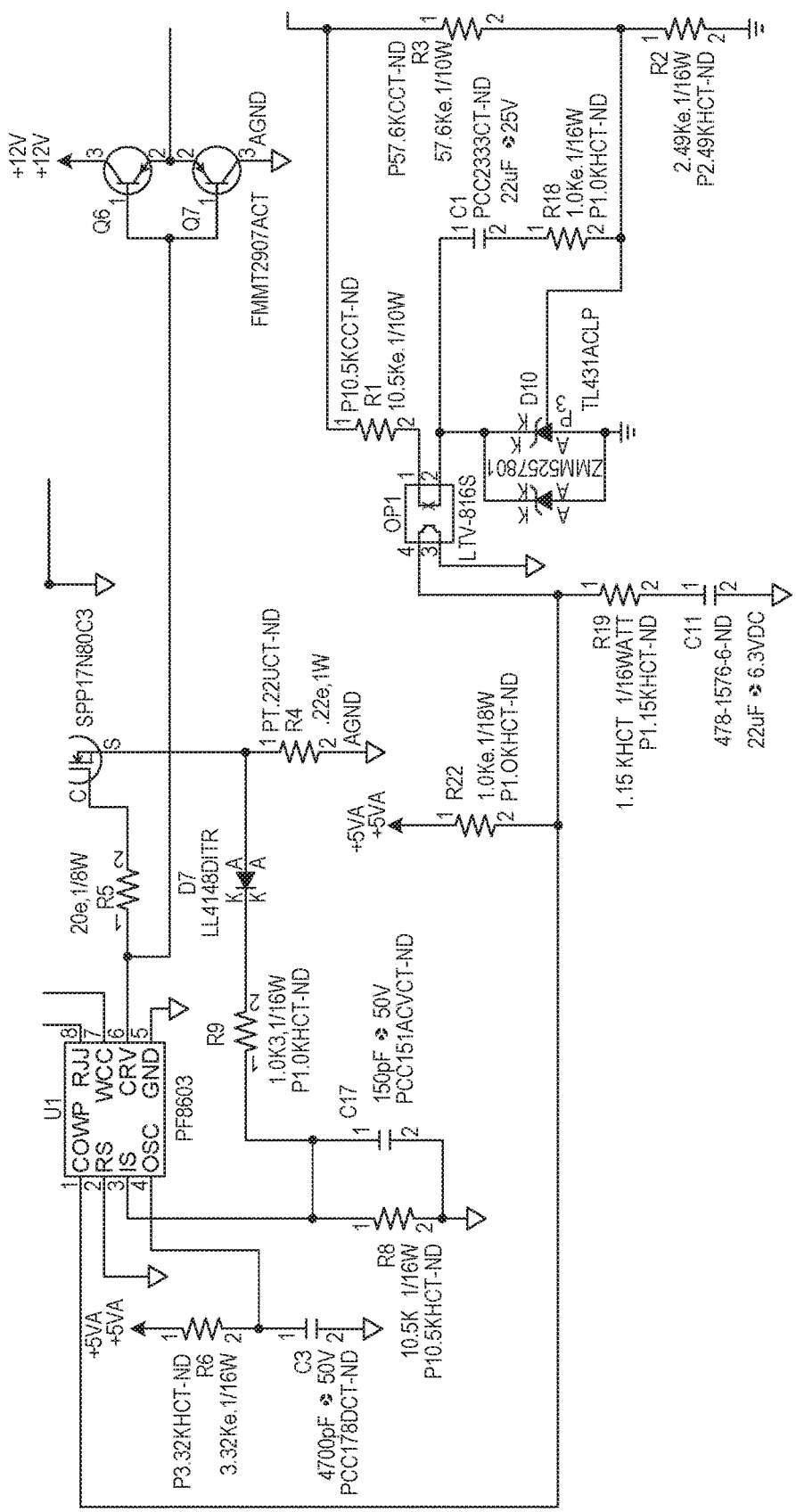
FIG. 11 shows a feedback loop section of the complementary converter circuit illustrated in FIGS. 4A-4C.

FIG. 11 shows a feedback loop section of the complementary converter circuit illustrated in FIGS. 4A-4C. The feedback loop section provides a servo feedback from the output applied to the load to the PWM switching controller U1. Resistors R1 and R3 connects to the output voltage applied to the load and measures the DC output voltage in real time. D10 is the reference operation amplifier. The output of D10 controls the intensity of internal LED OP1, which optically couples to a photo transistor. The output of pin4 of OP1 controls the DC Level to the comp line which adjusts the operation of PWM switching controller U1 for regulating switch Q1. Capacitors C1 and C11 are loop compensation capacitors which cause the loop response delay to be within 1 millisecond to result in a high power factor of 0.90 and higher.

Figure 12:
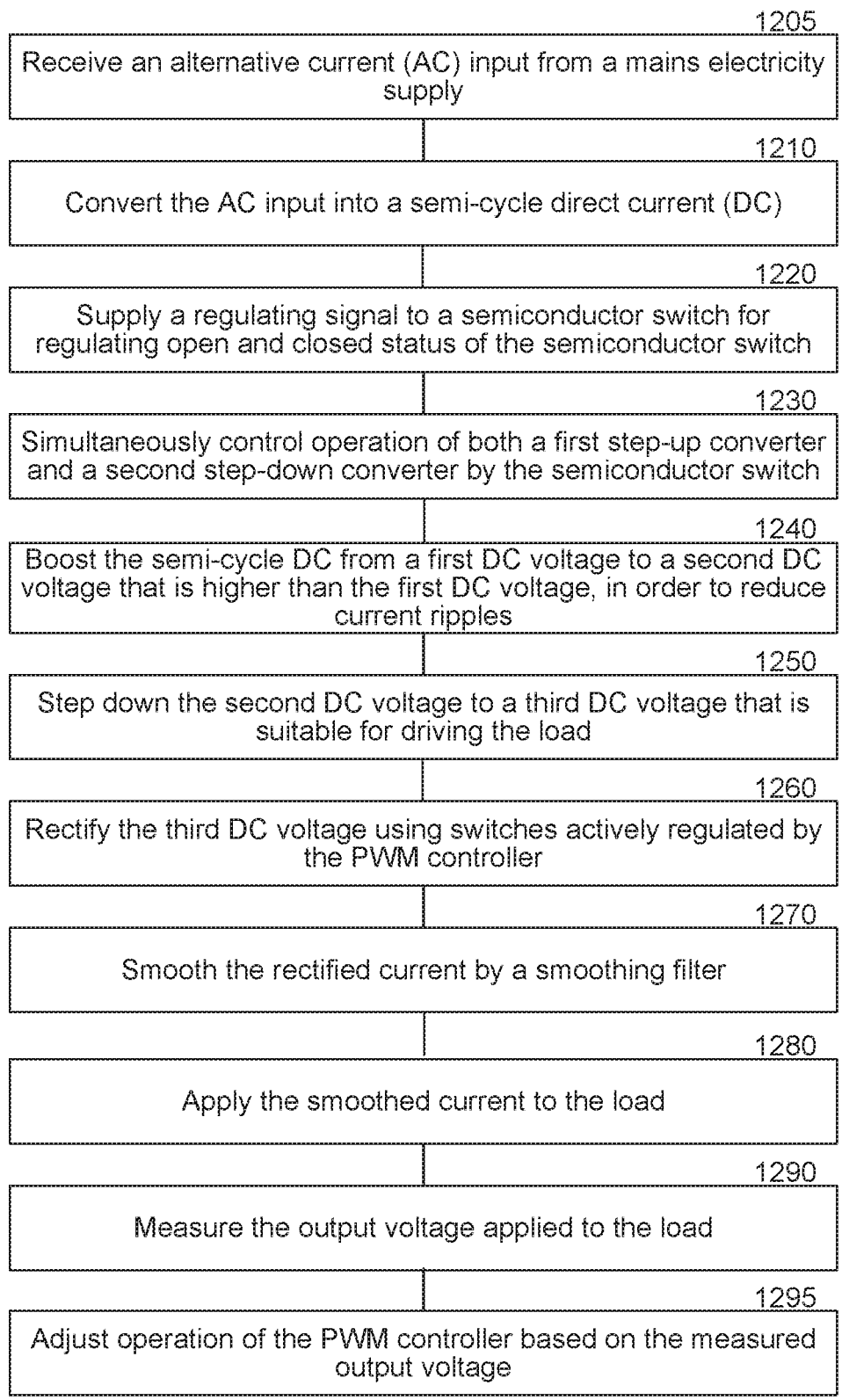
FIG. 12 illustrates a process of supplying a direct current to a load using the complementary converter circuit.

FIG. 12 illustrates a process of supplying a direct current to a load using the complementary converter circuit. The process at step 1205, where the complementary converter circuit receives an alternative current (AC) input from a mains electricity supply. At step 1210, a bridge rectifier of the complementary converter circuit converts the AC input into a semi-cycle direct current (DC). In some embodiments, the bridge rectifier includes diodes forming a bridge configuration for generating the semi-cycle direct current.

At step 1220, a pulse-width modulation (PWM) controller continuously supplies a regulating signal to a semiconductor switch for regulating open and closed status of the semiconductor switch. At step 1230, by switching between the open and closed states, the semiconductor switch simultaneously controls operation of both a first step-up converter and a second step-down converter. As both converters are controlled by the same semiconductor switch, the duty cycles and switching frequencies of the first step-up converter and the second step-down converter are synchronized. The first step-up converter and the second step-down converter are complementary to each other; in other words, the phase angles between current and voltage waveforms of the first step-up converter and the second step-down converter are substantially equal.

At step 1240, the first step-up converter boosts (also referred to as "step up") the semi-cycle DC from a first DC voltage to a second DC voltage that is higher than the first DC voltage, in order to reduce current ripples. In some embodiments, the first step-up converter operates in a discontinuous mode to utilize pulse proportional current (CPPC) to achieve power factor correction (PFC).

At step 1250, the second step-down converter steps down the second DC voltage to a third DC voltage that is suitable for driving the load. In some embodiments, the first step-up converter and the second step-down converter are electrically coupled to the shared semiconductor switch via an ORing architecture. In other words, one ORing diode of the first step-up converter and another ORing diode of the second step-down converter lead current from both converters to the shared semiconductor switch.

Although the first step-up converter has already reduced the current ripples, the complementary converter circuit can include an output synchronous rectifier to further flatten the fluctuating current (for the purpose of, e.g., improving the flickering index of the LED module). At step 1260, the output synchronous rectifier rectifies the third DC voltage using switches actively regulated by the PWM controller. The switches of the output synchronous rectifier are separated from the semiconductor switch controlling the first and second converters. But in some embodiments, all these switches can be controlled by the PWM controller. In some embodiments, the PWM controller regulates the switches of the output synchronous rectifier via an isolated gate drive circuit. The switches of the output synchronous rectifier are regulated to open the transistors at proper times to allow current flowing in a direction towards toward the load.

At step 1270, a smoothing filter including inductor(s) and capacitor(s) smooths the rectified current. At step 1280, the complementary converter circuit applies the smoothed current to the load (e.g., one or more LED modules). At step 1290, a servo feedback circuit measures the output voltage applied to the load. At step 1295, the PWM controller adjusts its operation based on the measured output voltage.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A power supply device, comprising:
    a rectifier configured to convert an alternative current (AC) into a direct current (DC);
    a first DC-to-DC boost converter configured to receive a first DC voltage from the rectifier and to convert the first DC voltage into a second DC voltage higher than the first DC voltage;
    a second DC-to-DC converter configured to receive the second DC voltage from the first DC-to-DC boost converter and to convert the second DC voltage into a third DC voltage appropriate for a load;
    a shared switch, wherein both the first DC-to-DC boost converter and the second DC-to-DC converter use the shared switch to control duty cycles of the first DC-to-DC boost converter and the second DC-to-DC converter; and
    a pulse-width modulation (PWM) controller configured to regulate open and closed status of the shared switch.

2. The power supply device of claim 1, wherein the PWM controller regulates the open and closed status of the shared switch to simultaneously regulate the synchronized duty cycles of the first DC-to-DC boost converter and the second DC-to-DC converter.

3. The power supply device of claim 1, wherein the pulse-width modulation (PWM) controller regulates the shared switch to perform power factor corrections on the first DC-to-DC boost converter and the second DC-to-DC converter simultaneously using constant pulse proportional current.

4. The power supply device of claim 1, wherein the first DC-to-DC boost converter and the second DC-to-DC converter are designed to complement each other.

5. The power supply device of claim 1, wherein the first DC-to-DC boost converter and the second DC-to-DC converter are designed so that phase angles between the currents and voltages of the first DC-to-DC boost converter and the second DC-to-DC converter are substantially equal.

6. The power supply device of claim 1, further comprising:
    an output synchronous rectifier configured to receive the third DC voltage and to convert the third DC voltage into a flat DC output for supplying electric power to the load;
    wherein the PWM controller is further electrically coupled to the output synchronous rectifier to control operation of the output synchronous rectifier.

7. The power supply device of claim 6, wherein the second DC-to-DC converter is a step-down converter including a transformer, and the output synchronous rectifier includes actively controlled switches for actively rectifying voltage outputted by the transformer of the second DC-to-DC converter.

8. The power supply device of claim 6, wherein the output synchronous rectifier includes a smoothing filter that includes at least one inductor and at least one capacitor.

9. The power supply device of claim 6, further comprising:
    an isolated gate drive circuit electrically coupled between the output synchronous rectifier and the PWM controller;
    wherein the PWM controller regulates operation of the output synchronous rectifier through the isolated gate drive circuit.

10. The power supply device of claim 9, wherein the isolated gate drive circuit includes switches actively regulated by the PWM controller.

11. The power supply device of claim 1, further comprising:
    a servo feedback circuit electrically coupled between the PWM controller and an output of the power supply device applied to the load;
    wherein the servo feedback circuit measures a DC output voltage of the power supply device and adjusts operation of the PWM controller based on the measured DC output voltage.

12. The power supply device of claim 11, wherein the servo feedback circuit includes a reference operation amplifier, and an internal light-emitting diode (LED) coupled with a photo transistor, the reference operation amplifier controls intensity of the internal LED based on the measured DC output voltage, the photo transistor senses the intensity of the internal LED and sends an electrical signal to an output of the PWM controller.

13. The power supply device of claim 1, wherein the rectifier is a bridge rectifier that includes multiple rectifying diodes forming a bridge to convert the AC into a semi-cycle pulse DC current.

14. The power supply device of claim 1, wherein the first DC-to-DC boost converter includes a first ORing diode, the second DC-to-DC converter includes a second ORing diode, and the first ORing diode and the second ORing diode form an ORing architecture for leading currents from the first DC-to-DC boost converter and the second DC-to-DC converter to the shared switch.

15. The power supply device of claim 1, wherein the PWM controller is an integrated circuit (IC) and the shared switch is a metal-oxide-semiconductor field-effect transistor (MOSFET) switch.

16. A light engine device, comprising:
    at least one light-emitting diode (LED) module;
    a bridge rectifier configured to convert an input alternative current (AC) into a semi-cycle direct current (DC);
    a DC-to-DC step-up converter configured to receive a first DC voltage from the bridge rectifier and to convert the first DC voltage into a second DC voltage higher than the first DC voltage to reduce current ripples;
    a DC-to-DC step-down converter configured to receive the second DC voltage from the first DC-to-DC step-up converter and to convert the second DC voltage into a third DC voltage appropriate for driving the at least one LED module;
    a shared semiconductor switch, wherein both the DC-to-DC step-up converter and the DC-to-DC step-down converter use the shared semiconductor switch to control duty cycles and switching frequencies of the DC-to-DC step-up converter and the DC-to-DC step-down converter;

a pulse-width modulation (PWM) controller configured to regulate open and closed status of the shared semiconductor switch;

an output synchronous rectifier electrically coupled between the DC-to-DC step-down converter and the at least one LED module, the output synchronous rectifier including switches controlled by the PWM controller to actively rectifying voltage and a smoothing filter for smoothing current applied to the LED module; and a servo feedback circuit configured to measure DC output voltage applied to the at least one LED module and to adjust operation of the PWM controller based on the measured DC output voltage.

17. A method for supplying a direct current to a load, comprising:

receiving an alternative current (AC) input from a mains electricity supply;

converting the AC input into a semi-cycle direct current (DC) by a rectifier;

supplying a regulating signal by a pulse-width modulation (PWM) controller to a semiconductor switch for regulating open and closed status of the semiconductor switch;

controlling operation of both a first step-up converter and a second step-down converter by the semiconductor switch;

stepping up the semi-cycle DC from a first DC voltage to a second DC voltage higher than the first DC voltage by the first step-up converter controlled by the semiconductor switch for reducing current ripples; and stepping down the second DC voltage to a third DC voltage suitable for driving the load by the second step-down converter controlled by the semiconductor switch.

18. The method of claim 16, further comprising:

actively rectifying the third DC voltage by an output synchronous rectifier including switches actively regulated by the PWM controller; and smoothing a rectified current by a smoothing filter and applied the smoothed current to the load.

19. The method of claim 17, further comprising:

measuring an output voltage applied to the load by a servo feedback circuit; and adjusting operation of the PWM controller based on the measured output voltage.

20. The method of claim 17, wherein the semiconductor switch controls the operation of both the first step-up converter and the second step-down converter such that phase angles between current and voltage waveforms of the first step-up converter and the second step-down converter are substantially equal.

21. The method of claim 17, wherein the PWM controller and the semiconductor switch controls the operation of both the first step-up converter and the second step-down converter such that duty cycles and switching frequencies of the first step-up converter and the second step-down converter are synchronized.

* * * * *